Aug. 21, 1962 G. B. STONE 3,050,178
TRACTION PATTERN FOR PULLEY SIDE OF CONVEYOR BELT
Filed Sept. 28, 1959
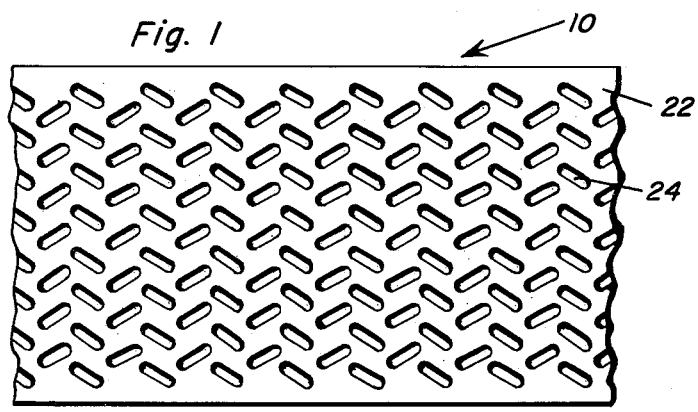
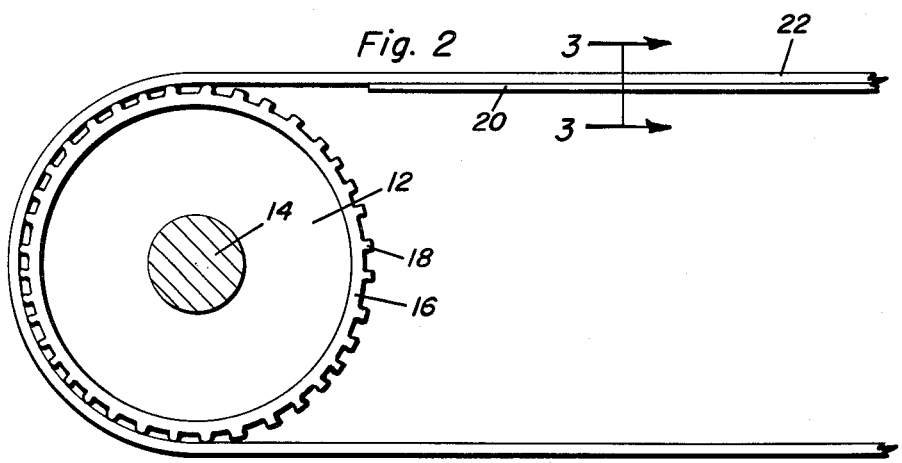
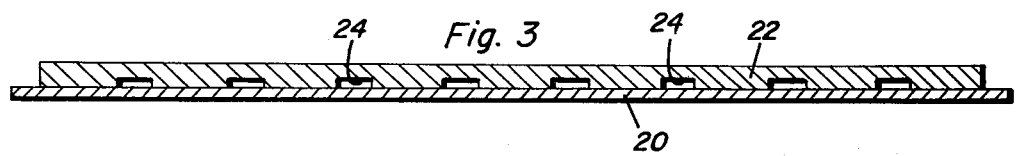
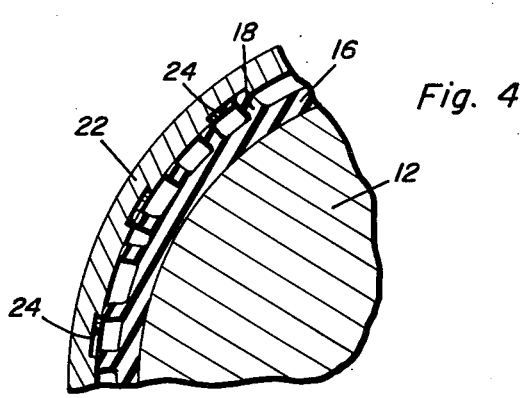
Guthrie B. Stone
INVENTOR.

United States Patent Office 3,050,178
Patented Aug. 21, 1962

3,050,178
TRACTION PATTERN FOR PULLEY SIDE
OF CONVEYOR BELT
Guthrie B. Stone, Main St., Honeoye, N.Y.
Filed Sept. 28, 1959, Ser. No. 842,968
1 Claim. (Cl. 198—203)

The present invention generally relates to novel structural arrangements in conveyor belts and conveyor belt systems and more particularly to a novel construction in the type of conveyor belt system having a slider bed.

Many belt conveyors are provided with a slider type bed underlying the load carrying run of the conveying belt in which the belt simply slides over the bed. It is desirable to keep the friction between the belt and the bed to a minimum and canvas or "friction surface" underside rubber belts are used. In other words, where the belt is rubber coated, the bottom side which is in sliding contact with the bed is usually made in such a manner so as to leave the fabric or canvas exposed thereby providing a low coefficient of friction. In the trade, such belts are termed "friction surface bottom" or "friction surface both sides" with the term "friction surface" actually meaning a minimum of friction.

When the coefficient of friction of the belt has been lowered where it engages the slider bed, it is also lowered where it engages the head pulley where the belt is driven. This will result in slippage and in order to overcome this problem, the pulley is usually lagged with a rough surface belt to provide additional traction but this is undesirable since a larger diameter pulley must be used and also, snub pulleys are used sometimes to provide a maximum of traction.

In order to overcome the existing problems, the primary object of the present invention is to provide a conveyor belt with a regular friction surface bottom that is provided with a multitude or plurality of slotted depressions or recesses in the underside of the belt with the depressions being in uniform relationship with one another and in a balanced pattern that would not cause the belt to wander on the pulley. The depressions could be of various shapes and arranged in a pattern so as to prevent additional frictional drag on the slider bed. The head pulley or the lagging thereon will be provided with a plurality of small projections so that the effect of a gear connection consisting of the pulley lagging and the belt will be effected. There is no indexing or timed relationship between the projections on the pulley lagging and the depressions with the dependence of the transmission driving force being placed on the plurality of gripping surfaces to provide superior traction.

There have previously been provided conveyor belts and pulleys having matching sets of indentations in the pulley and belt to provide a positive driving relationship. However, belts of this nature are subject to elongation by stretching thus eliminating proper matching relationship between the indentations or projections in the belt and the pulley. The present invention does not depend on timing or fitting any particular indentation to a particular point on the pulley nor does it require the pulley to have a certain circumference. The pattern in the belt is a random one as are the projections on the pulley lagging.

Another object of the present invention is to provide a conveyor belt having depressions arranged in a pattern design throughout the underside of the conveyor belt for engagement with the slider bed thereby tending to reduce frictional contact with the bed in addition to providing superior traction with the pulley.

A further object of the present invention is to provide a conveyor and pulley assembly which is simple in construction, easy to use, well adapted for its particular purposes and generally inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a bottom plan view of a portion of the conveyor belt illustrating the pattern of recesses, grooves or depressions in the underside of the conveyor belt;

FIGURE 2 is a side elevation of a portion of the conveyor belt, the slider bed and one of the end pulleys;

FIGURE 3 is a transverse, sectional view taken substantially upon a plane passing along section line 3—3 of FIGURE 2 illustrating the relationship of the slider bed and belt; and FIGURE 4 is a detailed sectional view illustrating the relationship of the pulley, the pulley lagging with the projections thereon and the conveyor belt with the depressions therein.

Referring now specifically to the drawings, the numeral 10 generally designates the conveyor belt of the present invention which is mounted for passing over a head pulley 12 carried by a drive shaft 14 with the pulley 12 having lagging 16 thereon with the lagging having a plurality of projections 18. The lagging 16 and the projections 18 are preferably of rubber or an equivalent relatively hard material.

The conveyor belt 10 is of the type employing a slider bed 20 for supporting the load carrying run thereof and the conveyor belt 10 is also in the form of an endless flexible member 22 which may be a friction surface bottom conveyor belt which may have the ends thereof secured together in any suitable manner for forming an endless flexible belt. The friction surface bottom of the belt is one in which the fabric or canvas from which the belt is constructed is exposed to the bottom surface for engagement with the slider bed 20. To provide traction between the pulley 12 and the belt 22, the belt 22 is provided with a plurality of recesses, depressions or grooves 24 in the undersurface or pulley side thereof for engagement by the projections 18. The orientation of the grooves or depressions 24 in relation to the projections 18 is a random relationship in that there is no timing between the projections and the grooves. By providing the grooves or depressions 24 throughout the entire area of the undersurface of the belt 22, the projections 18 may be spaced so that at least some of the projections 18 in the area engaged by the belt will engage some of the depressions for providing traction to the belt. This is accomplished by having the projections on the lagging disposed in multiples that will easily cause the projections to intermesh with the slots or grooves on the pulley side of the conveyor belt.

Thus, even if the conveyor belt should stretch or if a different diameter head pulley was employed, the driving relationship between the pulley and the belt still would be maintained.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a conveyor belt and pulley assembly including a drive pulley, a slider bed and an elongated flexible belt member of rubber and fabric construction having a friction reducing pulley engaging surface in which the fabric is partially exposed to provide a low coefficient of friction for sliding engagement with the slider bed and traction engagement with the drive pulley whereby such surface reduces the force required to drag the belt along the surface of the slider bed and also increases slippage between the pulley engaging surface of the belt and the drive pulley, that improvement comprising the friction reducing surface of the belt being provided with a plurality of recesses therein for further reducing the force required to drag the belt along the slider bed, said recesses being randomly arranged and spaced longitudinally and transversely of each other throughout the friction reducing surface of the belt, said pulley including a lagging on the outer surface thereof having a plurality of radial projections thereon, said projections being randomly arranged and spaced peripherally and longitudinally from each other on the lagging, said lagging and projections being of resilient material thereby eliminating the necessity of maintaining a timed relation between the belt and drive pulley, the randomly arranged recesses in the belt and the randomly arranged projections on the pulley forming a driving engagement with reduced slippage therebetween.

References Cited in the file of this patent
UNITED STATES PATENTS

| | | |
|---|---|---|
| 1,824,858 | Williams | Sept. 29, 1931 |
| 2,724,974 | Ayres | Nov. 29, 1955 |
| 2,859,861 | Sheehan | Nov. 11, 1958 |
| 2,940,586 | Vamvakas | June 14, 1960 |
| 2,941,410 | Ota | June 21, 1960 |